US011498591B2

United States Patent
Misu (10) Patent No.: US 11,498,591 B2
(45) Date of Patent: Nov. 15, 2022

(54) SYSTEM AND METHOD FOR PROVIDING ADAPTIVE TRUST CALIBRATION IN DRIVING AUTOMATION

(71) Applicant: Honda Motor Co., Ltd., Tokyo (JP)

(72) Inventor: Teruhisa Misu, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 362 days.

(21) Appl. No.: 16/797,337

(22) Filed: Feb. 21, 2020

(65) Prior Publication Data

US 2021/0078608 A1 Mar. 18, 2021

Related U.S. Application Data

(60) Provisional application No. 62/899,886, filed on Sep. 13, 2019.

(51) Int. Cl.
*B60W 60/00* (2020.01)
*B60R 11/04* (2006.01)
*G06N 7/00* (2006.01)
*G06V 20/59* (2022.01)
(Continued)

(52) U.S. Cl.
CPC ......... *B60W 60/0059* (2020.02); *B60R 11/04* (2013.01); *G06N 7/005* (2013.01); *G06V 20/597* (2022.01); *G06V 40/19* (2022.01); *B60R 2011/0003* (2013.01); *B60R 2011/004* (2013.01); *B60W 2420/52* (2013.01); *B60W 2540/22* (2013.01); *B60W 2540/225* (2020.02)

(58) Field of Classification Search
CPC ......... B60W 60/0059; B60W 2420/52; B60W 2540/22; B60W 2540/225; B60R 11/04; B60R 2011/0003; B60R 2011/004; G06N 7/005; G06V 20/597; G06V 40/19
See application file for complete search history.

(56) References Cited

U.S. PATENT DOCUMENTS 9,989,963 B2* 6/2018 Perkins ................. B60W 10/04
11,046,247 B1* 6/2021 Park ....................... B60K 35/00
2018/0072327 A1* 3/2018 Seppelt ................... G06N 20/00

OTHER PUBLICATIONS

L. Rabiner and B. Juang, "An introduction to hidden Markov models," IEEE ASSP Magazine, vol. 3, No. 1, pp. 4-16, Jan. 1986.
(Continued)

*Primary Examiner* — Kenneth J Malkowski
(74) *Attorney, Agent, or Firm* — Rankin, Hill & Clark LLP (57) ABSTRACT

A system and method for providing adaptive trust calibration in driving automation that include receiving image data of a vehicle and vehicle automation data associated with automated of driving of the vehicle. The system and method also include analyzing the image data and vehicle automation data and determining an eye gaze direction of a driver of the vehicle and a driver reliance upon automation of the vehicle and processing a Markov decision process model based on the eye gaze direction and the driver reliance to model effects of human trust and workload on observable variables to determine a control policy to provide an optimal level of automation transparency. The system and method further include controlling autonomous transparency of at least one driving function of the vehicle based on the control policy.

20 Claims, 6 Drawing Sheets

(51) Int. Cl.
  *G06V 40/19* (2022.01)
  *B60R 11/00* (2006.01)

(56) References Cited

OTHER PUBLICATIONS

K. Akash, K. Polson, T. Reid, and N. Jain, "Improving Human-Machine Collaboration Through Transparency-based Feedback—Part I: Human Trust and Workload Model," IFAC-PapersOnLine, vol. 51, No. 34, pp. 315-321, Jan. 2019.
K. Akash, T. Reid, and N. Jain, "Improving Human-Machine Collabo-ration Through Transparency-based Feedback—Part II: Control Design and Synthesis," IFAC-PapersOnLine, vol. 51, No. 34, pp. 322-328, Jan. 2019.
A. R. Cassandra, L. P. Kaelbling, and M. L. Littman, "Acting optimally in partially observable stochastic domains," in AAAI, vol. 94, 1994, pp. 1023-1028.
J. Y. Chen, K. Procci, M. Boyce, J. Wright, A. Garcia, and M. Barnes, "Situation awareness-based agent transparency," Army Research Lab Aberdeen Proving Ground MD Human Research and Engineering Directorate, Tech. Rep., 2014.
S. M. Merritt and D. R. Ilgen, "Not all trust is created equal: Dis-positional and history-based trust in human-automation interactions," Human Factors, vol. 50, No. 2, pp. 194-210, 2008.

\* cited by examiner

SYSTEM AND METHOD FOR PROVIDING ADAPTIVE TRUST CALIBRATION IN DRIVING AUTOMATION

CROSS-REFERENCE TO RELATED APPLICATION

This application claims priority to U.S. Provisional Application Ser. No. 62/899,886 filed on Sep. 13, 2019, which is expressly incorporated herein by reference.

BACKGROUND

Individuals are increasingly becoming dependent on automated systems in vehicles ranging from advanced driver-assistance systems (ADAS) like adaptive cruise control and collision avoidance to self-driving automation. Even with significant growth in technological capabilities, human supervision and intervention are still required. Researchers have shown that human trust plays a critical role in these interactions between human and automated systems. On one hand, low levels of trust may lead to disuse of automation and therefore losing the benefits of the automation. On the other hand, over-trust may lead to a human disengaging fully from the driving process.

BRIEF DESCRIPTION

According to one aspect, a computer-implemented method for providing adaptive trust calibration in driving automation that includes receiving image data of a vehicle and vehicle automation data associated with automated of driving of the vehicle and analyzing the image data and vehicle automation data and determining an eye gaze direction of a driver of the vehicle and a driver reliance upon automation of the vehicle. The computer-implemented method also includes processing a Markov decision process model based on the eye gaze direction and the driver reliance to model effects of human trust and workload on observable variables to determine a control policy to provide an optimal level of automation transparency. Dynamics of human trust and workload states are analyzed based on the effects modeled using the Markov decision process model. The computer-implemented method further includes controlling autonomous transparency of at least one driving function of the vehicle based on the control policy.

According to another aspect, a system for providing adaptive trust calibration in driving automation that includes a memory storing instructions when executed by a processor cause the processor to receive image data of a vehicle and vehicle automation data associated with automated of driving of the vehicle and analyze the image data and vehicle automation data and determining an eye gaze direction of a driver of the vehicle and a driver reliance upon automation of the vehicle. The instructions also cause the processor to process a Markov decision process model based on the eye gaze direction and the driver reliance to model effects of human trust and workload on observable variables to determine a control policy to provide an optimal level of automation transparency. Dynamics of human trust and workload states are analyzed based on the effects modeled using the Markov decision process model. The instructions further cause the processor to control autonomous transparency of at least one driving function of the vehicle based on the control policy.

According to yet another aspect, a non-transitory computer readable storage medium storing instructions that when executed by a computer, which includes a processor perform a method that includes receiving image data of a vehicle and vehicle automation data associated with automated of driving of the vehicle and analyzing the image data and vehicle automation data and determining an eye gaze direction of a driver of the vehicle and a driver reliance upon automation of the vehicle. The method also includes processing a Markov decision process model based on the eye gaze direction and the driver reliance to model effects of human trust and workload on observable variables to determine a control policy to provide an optimal level of automation transparency. Dynamics of human trust and workload states are analyzed based on the effects modeled using the Markov decision process model. The method further includes controlling autonomous transparency of at least one driving function of the vehicle based on the control policy.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components.

The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
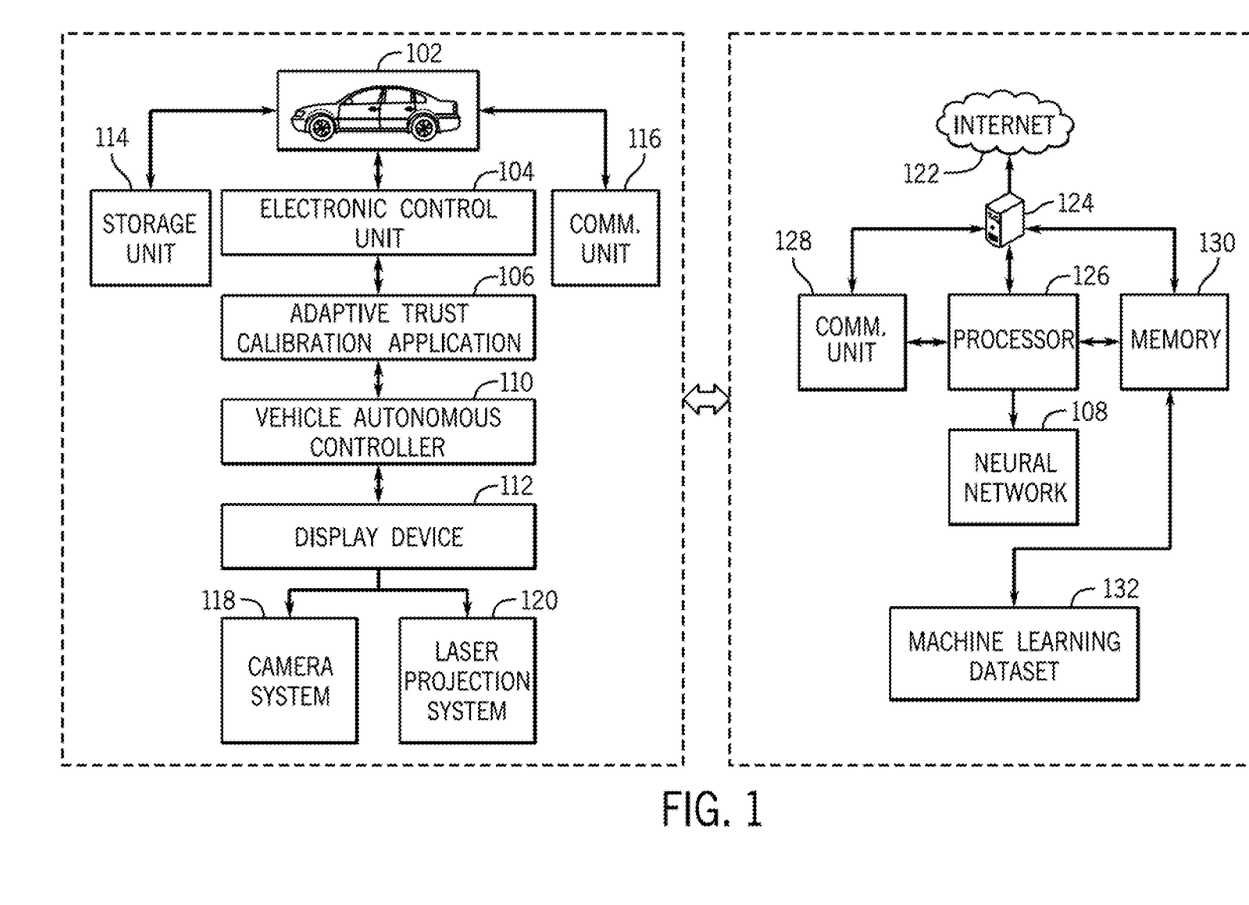
FIG. 1 is a schematic view of an exemplary operating environment for implementing systems and methods for providing adaptive trust calibration in driving automation according to an exemplary embodiment of the present disclosure.

Referring now to the drawings, wherein the showings are for purposes of illustrating one or more exemplary embodiments and not for purposes of limiting same, FIG. 1 is a schematic view of an exemplary operating environment 100 for implementing systems and methods for providing adaptive trust calibration in driving automation according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes a vehicle 102 with an electronic control unit (ECU) 104 that executes one or more applications, operating systems, vehicle system and subsystem user interfaces, among others. The ECU 104 may also execute an adaptive trust calibration application (adaptive trust application) 106 that is configured to adjust a level of automation transparency that is provided in the form of one or more augmented reality cues that may be provided to an individual (driver) (not shown) of the vehicle 102 during semi-autonomous/autonomous operation of the vehicle 102. As discussed in more detail below, the adaptive trust application 106 may be configured to vary automation transparency and functionality with respect to one or more driving functions of the vehicle 102 that may be based on human trust and workload estimates.

In one embodiment, the adaptive trust application 106 may be configured to utilize a neural network 108 to execute a machine learning/deep learning probabilistic framework using a partially observable Markov decision process (POMDP) model. The POMDP may be configured as a model of human trust and workload dynamics as they evolve during an individual driver's interaction with driving automation (e.g., SAE level 2 driving automation) control of one or more driving functions of the vehicle 102. The POMDP model may be trained using human subject data that may capture the effects of scene complexity, automation reliability, and automation transparency on the driver's trust and workload with respect to semi-autonomous/autonomous operation of the vehicle 102.

In one configuration, the adaptive trust application 106 may be configured to model the effects of the human trust and workload on observable variables of the driver's reliance on the autonomous control of one or more driving functions of the vehicle 102 and the driver's workload during semi-autonomous/autonomous operation of the vehicle 102 by a vehicle autonomous controller 110 of the vehicle 102.

In particular, the adaptive trust application 106 may determine an effect on human trust and human workload with respect to the automated driving of the vehicle 102 that is based on the scene complexity, the automation reliability, and a current real-time automation transparency to populate corresponding data points to a machine learning dataset 132. The stored data points of the machine learning dataset 132 may be analyzed and utilized to determine an optimal level of automation transparency to thereby control a level of automation transparency and/or an autonomous operation of one or more driving functions of the vehicle 102.

As discussed below, trust dynamics may be determined based on the driver's reliance on the semi-autonomous/autonomous operation of the vehicle 102. Additionally, a real-time automation transparency that is provided to the driver of the vehicle 102 in the form of one or more augmented reality cues may be analyzed with respect to determining trust dynamics. In addition, automation reliability that is associated with the semi-autonomous/autonomous operation of the vehicle 102 and a scene complexity that may be determined with respect to a scene of the surrounding environment of the vehicle 102 may be analyzed with respect to determining trust dynamics.

Additionally, workload dynamics may be determined based on the eye gaze directions of the driver over a predetermined period of time. Additionally, automation transparency, automation reliability, and scene complexity may also be utilized as actions of workload dynamics. Accordingly, the adaptive trust application 106 may capture a dynamic interaction between trust and workload behavior as it evolves over time (e.g., in real-time and as predicted a future point in time t+1) and may be configured to process and implement an optimal control policy to appropriately vary automation transparency. In some configurations, in addition to varying automation transparency, the adaptive trust application 106 may be configured to alter the semi-autonomous/autonomous operation of one or more driving functions to achieve trust calibration.

With continued reference to FIG. 1, the ECU 104 of the vehicle 102 may execute one or more applications, operating systems, vehicle system and subsystem executable instructions, among others. In one or more embodiments, the ECU 104 may include a respective microprocessor, one or more application-specific integrated circuit(s) (ASIC), or other similar devices. The ECU 104 may also include respective internal processing memory, an interface circuit, and bus lines for transferring data, sending commands, and communicating with the plurality of components of the vehicle 102.

The ECU 104 may also include a respective communication device (not shown) for sending data internally to components of the vehicle 102 and communicating with externally hosted computing systems (e.g., external to the vehicle 102). In one embodiment, the ECU 104 may be operably connected to a head unit (not shown) of the vehicle 102 that may include and/or may be operably connected to one or more display devices 112 and one or more audio devices (not shown). In one embodiment, the display device(s) 112 may be located within the center of the dashboard of the vehicle 102 or any other location within the vehicle 102. In some configurations, the display device(s) 112 may be configured as a meter display (not shown) that is disposed behind a steering wheel (not shown) of the vehicle 102. The meter display may include a dashboard display or an instrument cluster display. In additional embodiments, the display device(s) 112 may be alternatively or additionally configured as head up display (HUD) (not shown) that may be projected/disposed upon a windshield (not shown) of the vehicle 102.

In one embodiment, the adaptive trust application 106 may be configured to utilize the display device(s) 112 to provide one or more of the levels of automation transparency that are provided in the form of one or more augmented reality cues that may be presented to driver of the vehicle 102 through the display device(s) 112. In some configurations, the adaptive trust application 106 may also be configured to utilize the audio device(s) to provide audio based alerts that may be heard within the vehicle 102 to provide one or more levels of automation transparency.

In an exemplary embodiment, the adaptive trust application 106 may utilize data included within the machine learning dataset 132 to process the optimal automation transparency control policy to thereby operably control the display device(s) 112 to present the one or more augmented reality cues to provide one or more levels of automation transparency during semi-autonomous/autonomous operation of the vehicle 102. The adaptive trust application 106 may be configured to continually vary automation transparency that may be provided through the display device(s) 112 based on the control policy that may continually provide an optimal level of automation transparency that may be based on human trust and workload estimates.

In an exemplary embodiment, the ECU 104 may additionally communicate with a storage unit 114 to execute one or more applications, operating systems, vehicle systems and subsystem user interfaces, and the like that are stored on the storage unit 114. In one or more embodiments, the storage unit 114 may be accessed by the adaptive trust application 106 to store data, for example, one or more internal images of the vehicle 102, one or more external images of a surrounding environment of the vehicle 102, one or more sets of LiDAR coordinates (e.g., LiDAR coordinates associated with a position of one or more objects that may be located within the surrounding environment of the vehicle 102), one or more sets of locational coordinates (e.g., GPS/DGPS coordinates), and/or vehicle dynamic data associated with a dynamic vehicle parameters of the vehicle 102.

In one embodiment, the ECU 104 may be configured to communicate with the vehicle autonomous controller 110 of the vehicle 102 to execute autonomous driving commands to operate the vehicle 102 to autonomously control one or more driving functions of the vehicle 102. The one or more driving functions may include, but may not be limited to steering, braking, accelerating, merging, turning, coasting, and the like. In one embodiment, the adaptive trust application 106 may utilize data included within the machine learning dataset 132 to communicate with the vehicle autonomous controller 110 to control the level of automation transparency and/or an autonomous operation of one or more driving functions of the vehicle 102. In some cases, the adaptive trust application 106 may be configured to communicate with the vehicle autonomous controller 110 to provide autonomous operation of one or more driving functions of the vehicle 102 to account for one or more external factors that may include, but may not be limited to, road/pathway conditions of a road/pathway on which the vehicle 102 is traveling, a lane in which the vehicle 102 is traveling, status of traffic signals, traffic patterns, traffic regulations, etc.

In an exemplary embodiment, the ECU 104 may additionally be configured to operably control a camera system 118 of the vehicle 102. The camera system 118 may include one or more cameras (not shown) that are positioned at one or more internal portions of an interior cabin of the vehicle 102 to capture images of the driver of the vehicle 102. The camera system 118 may also include one or more cameras that are positioned at one or more external portions of the vehicle 102 to capture images of the surrounding environment of the vehicle 102 (e.g., a predetermined area located around (front/side/behind) the vehicle 102.

In particular, the one or more cameras that are positioned at one or more internal portions of an interior cabin of the vehicle 102 may be configured to capture images of the driver's eyes to be analyzed to the driver's eye movements within the vehicle 102. In an exemplary embodiment, the one or more cameras may be configured to capture images of the driver's eyes and send respective image data to the adaptive trust application 106. The adaptive trust application 106 may be configured to analyze the image data associated with one or more images captured for a predetermined period of time to analyze one or more gaze cues to recognize the driver's eye gaze cues over a predetermined period of time.

In an exemplary embodiment, the adaptive trust application 106 may continuously analyze the gaze cues to recognize the driver's eye gaze directions. Specifically, the adaptive trust application 106 may detect the location of the driver's eyes from the image(s) sent by camera system 118 and may specifically evaluate specific areas of the eyes (e.g., iris, pupil, corners of the eye, etc.). The adaptive trust application 106 may utilize virtually any method to perform gaze detection and translate the gaze cues to determine the driver's eye gaze directions. In one embodiment, the adaptive trust application 106 may analyze the eye gaze directions of the driver based off of a linear model that may take into account the evaluation of the specific areas of the eyes of the driver of the vehicle 102.

With respect to the one or more cameras that are positioned at the external surrounding environment of the vehicle 102, the one or more cameras may be disposed at one or more external front portions of the vehicle 102. The one or more cameras of the camera system 118 may be disposed at external front portions of the vehicle 102, including, but not limited to different portions of the vehicle dashboard, vehicle bumper, vehicle front lighting units, vehicle fenders, and the windshield. In one embodiment, the one or more cameras may be configured as RGB cameras that may capture RGB bands that are configured to capture rich information about object appearance, as well as relationships and interactions between the vehicle 102 and objects within the surrounding environment of the vehicle 102.

In other embodiments, the one or more cameras may be configured as stereoscopic cameras that are configured to capture environmental information in the form three-dimensional images. In one or more configurations, the one or more cameras may be configured to capture one or more first person viewpoint RGB images/videos of the surrounding environment of the vehicle 102. The camera system 118 may be configured to convert one or more RGB images/videos (e.g., sequences of images) into image data that is communicated to the adaptive trust application 106 to be analyzed.

In one embodiment, the adaptive trust application 106 may be configured to analyze the image data that pertains to the surrounding environment of the vehicle 102 to determine a scene of the surrounding environment of the vehicle 102. The scene of the surrounding environment may include one or more dynamic objects (e.g., other vehicles, pedestrians) that may be located within the surrounding environment of the vehicle 102, one or more static objects (e.g., street signs, trees, buildings) that may be located within the surrounding environment of the vehicle 102, one or more roads/pathways that may be located within the surrounding environment of the vehicle 102 (e.g., streets, intersections), one or more lanes that may be located upon one or more roads/pathways that may be located within the surrounding environment of the vehicle 102, and the like. As discussed below, the adaptive trust application 106 may determine a scene complexity (e.g., value, designation) that may be associated with the scene of the vehicle 102 as determined based on image data provided by the camera system 118 and/or data provided by a laser projection system 120 of the vehicle 102.

In an exemplary embodiment, the laser projection system 120 may include one or more LiDAR transceivers (not shown). The one or more LiDAR transceivers of the laser projection system 120 may be disposed at respective external front, rear, and/or side portions of the vehicle 102 including but not limited to different portions of bumpers, body panels, fenders, lighting units, and/or windows/windshield. The one or more respective LiDAR transceivers may include one or more planar sweep lasers that may be configured to oscillate and emit one or more laser beams of ultraviolet, visible, or near infrared light toward the surrounding environment of the vehicle 102. The laser projection system 120 may be configured to receive one or more reflected laser waves based on one or more laser beams emitted by the LiDAR transceivers. The one or more reflected laser waves may be reflected off of one or more objects (e.g., static and/or dynamic objects) that may be located within the surrounding environment of the vehicle 102.

In one configuration, the laser projection system 120 may be configured to output LiDAR data associated to one or more reflected laser waves to the adaptive trust application 106. The adaptive trust application 106 may be configured to analyze the LiDAR data that pertains to the surrounding environment of the vehicle 102 to determine the scene of the surrounding environment of the vehicle 102 based on the location of one or more dynamic objects that may be located within the surrounding environment of the vehicle 102, one or more static objects that may be located within the surrounding environment of the vehicle 102, one or more roads/pathways (e.g., that may include guardrails, curbs, barrier, etc.) that may be located within the surrounding environment of the vehicle 102, one or more lanes that may be located upon one or more roads/pathways that may be located within the surrounding environment of the vehicle 102, and the like. As discussed below, the adaptive trust application 106 may determine a scene complexity (e.g., value, designation) that may be associated with the scene of the vehicle 102 as determined based on LiDAR data provided by the laser projection system 120 and/or the image data provided by the camera system 118.

In one or more embodiments, the vehicle 102 may additionally include a communication unit 116 that may be operably controlled by the ECU 104. The communication unit 116 may be operably connected to one or more transceivers (not shown) of the vehicle 102. The communication unit 116 may be configured to communicate through an internet cloud 122 through one or more wireless communication signals that may include, but may not be limited to Bluetooth® signals, Wi-Fi signals, ZigBee signals, Wi-Max signals, and the like. The communication unit 116 may be configured to communicate through the internet cloud 122 to send and receive communication signals to and from an externally hosted server infrastructure (external server) 124. The external server 124 may host the neural network 108 and may execute the adaptive trust application 106 to utilize processing power to determine an effect on human trust and workload with respect to automated driving of the vehicle 102 to thereby process the control policy used to control autonomous transparency associated with the semi-autonomous/autonomous operation of at least one driving function of the vehicle 102.

The neural network 108 may be utilized to model the effects of human trust and workload on observable variables using a Markov decision process model to thereby enable the application 106 to analyze the human trust dynamics and workload dynamics based on the effects modeled using the Markov decision process model. In an exemplary embodiment, the components of the external server 124 including the neural network 108 may be operably controlled by a processor 126. The processor 126 may be configured to operably control the neural network 108 to utilize machine learning/deep learning to provide artificial intelligence capabilities that may be utilized to build the machine learning dataset 132.

With continued reference to the external server 124, the processor 126 may be operably connected to a memory 130. The memory 130 may store one or more operating systems, applications, associated operating system data, application data, executable data, and the like. In one or more embodiments, the machine learning dataset 132 may be configured as a dataset that includes one or more fields associated with data that may pertain to one or more determined levels of human trust and workload with respect to the automated driving of the vehicle 102 that is based on one or more of the scene complexity, the automation reliability, and the automation transparency. In particular, the one or more fields may include a real-time determination of driver reliance, automation reliability, scene complexity, and automation transparency levels provided to the driver of the vehicle 102. Additionally, the one or more fields may include a prediction of driver reliance and driver workload that may be based on the real-time determination of driver reliance and driver workload.

In one embodiment, the processor 126 of the external server 124 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the vehicle 102.

II. The Adaptive Trust Calibration Application and Related Methods

The components of the adaptive trust application 106 will now be described according to an exemplary embodiment and with reference to FIG. 1. In an exemplary embodiment, the adaptive trust application 106 may be stored on the memory 130 and executed by the processor 126 of the external server 124. In another embodiment, the adaptive trust application 106 may be stored on the storage unit 114 of the vehicle 102 and may be executed by the ECU 104 and/or the head unit of the vehicle 102.

Figure 2:
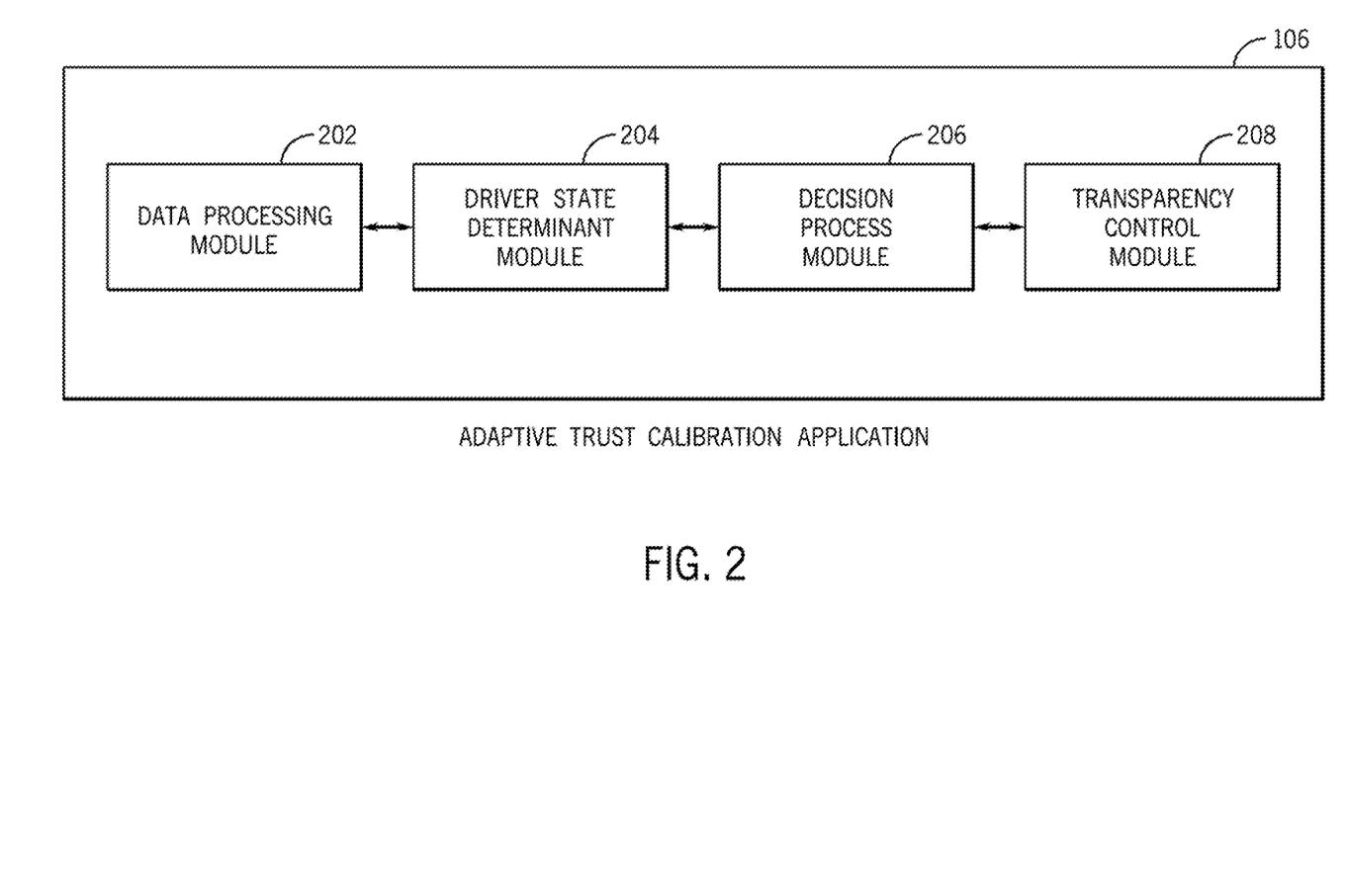
FIG. 2 is a schematic overview of a plurality of modules of an adaptive trust application according to an exemplary embodiment of the present disclosure.

The general functionality of the adaptive trust application 106 will now be discussed. FIG. 2 is a schematic overview of a plurality of modules 202-208 of the adaptive trust application 106 according to an exemplary embodiment of the present disclosure. In an exemplary embodiment, the adaptive trust application 106 may include a data processing module 202, a driver state determinant module 204, a decision process module 206, and a transparency control module 208. However, it is to be appreciated that the adaptive trust application 106 may include one or more additional modules and/or sub-modules that are included in addition to the modules 202-208. Methods and examples describing process steps that are executed by the modules 202-208 of the adaptive trust application 106 will now be described in more detail.

Figure 3:
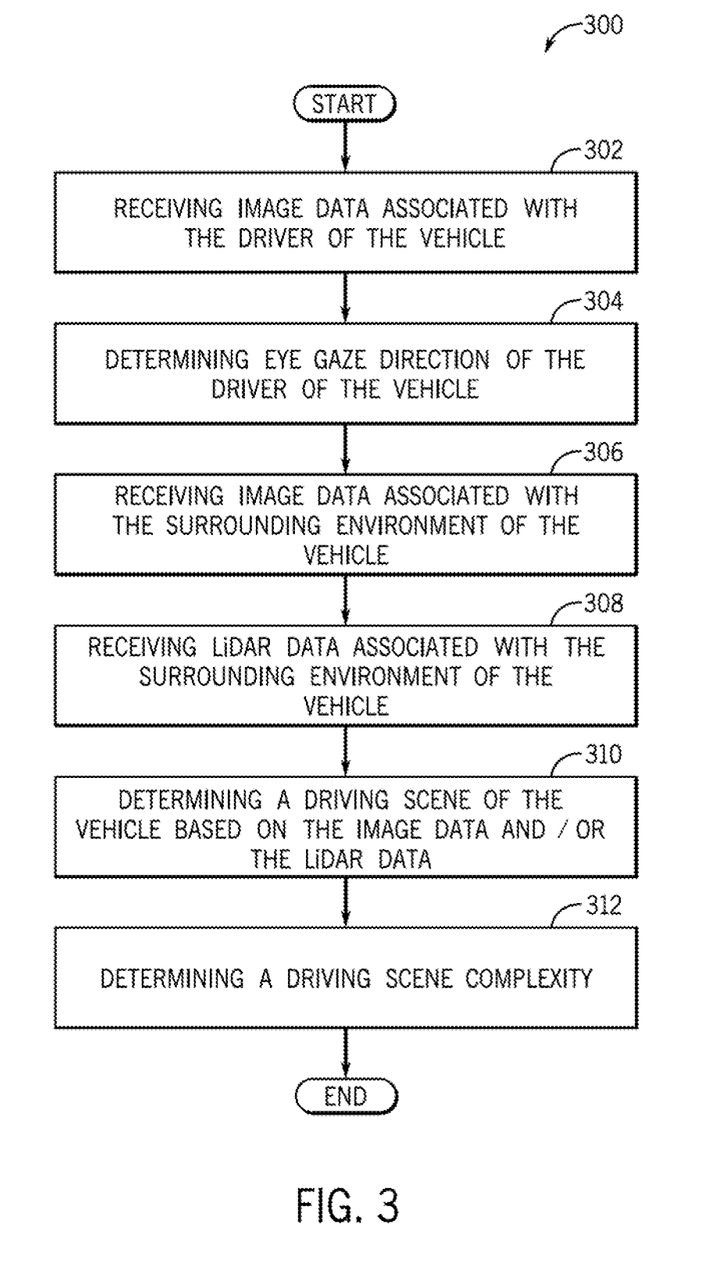
FIG. 3 is a process flow diagram of a method for determining eye gaze directions of the driver and a driving scene complexity according to an exemplary embodiment of the present disclosure.

FIG. 3 is a process flow diagram of a method 300 for determining eye gaze directions of the driver and a driving scene complexity according to an exemplary embodiment of the present disclosure. FIG. 3 will be described with reference to the components of FIG. 1, through it is to be appreciated that the method 300 of FIG. 3 may be used with other systems/components. In an exemplary embodiment, the adaptive trust application 106 may execute the method 300 during a semi-autonomous operating mode of the vehicle 102 (e.g., hands-off driving scenario).

Within the semi-autonomous operating mode, steering, acceleration, and braking may be autonomously controlled by the vehicle autonomous controller 110 of the vehicle 102. However, the driver may still be responsible to manually drive the vehicle 102 such that the driver may have to supervise and takeover control of the steering, acceleration, and/or braking of the vehicle 102 in one or more circumstances as deemed by the driver. Accordingly, the semi-autonomous operating mode may reduce the driver's workload. The adaptive trust application 106 utilizes computer-executed processes to thereby ensure that benefits of such operation of the vehicle 102 are enhanced by maximizing the driver's trust in the semi-autonomous control of the vehicle 102.

The method 300 may begin at block 302, wherein the method 300 may include receiving image data associated with the driver of the vehicle 102. In an exemplary embodiment, the data processing module 134 may be configured to communicate with the camera system 118 of the vehicle 102 to receive image data. In particular, the data processing module 134 may receive image data that may be associated with images that are captured of the driver's eyes.

The method 300 may proceed to block 304, wherein the method 300 may include determining eye gaze directions of the driver of the vehicle 102. In an exemplary embodiment, upon receiving the image data associated with images that are captured of the driver's eyes, the data processing module 202 may be configured to analyze the image data associated with one or more images captured for a predetermined period of time to analyze one or more gaze cues that may be utilized to recognized the driver's eye gaze.

In particular, the data processing module 202 may continuously analyze the gaze cues to recognize the driver's eye gaze directions for a predetermined period of time. The data processing module 202 may thereby detect the location of the driver's eyes from the image(s) sent by camera system 118 and may specifically evaluate specific areas of the eyes to determine the driver's eye gaze directions. The data processing module 202 may utilize virtually any method to translate the gaze cues to determine the driver's eye gaze directions. In one embodiment, the data processing module 202 may analyze the driver's eye gaze directions based off of a linear model that may take into account the evaluation of the specific areas of the eyes of the driver of the vehicle 102 as the vehicle 102 is being operated.

The data processing module 202 may thereby determine eye gaze directions of the driver of the vehicle 102 based on the gaze (viewpoint) of the driver with respect to one or more areas internal to the vehicle 102 and/or external of the vehicle 102 and may output respective data. For example, the data processing module 202 may discretize the driver's gaze direction $O_G$ at any time belonging to one of a plurality of values pertaining to the driver's eye gaze direction that may include, but may not be limited to, the driver's eye gaze direction toward the road on which the vehicle 102 is traveling $G_{road}$, the driver's eye gaze direction toward another vehicle that may be located within the surrounding environment of the vehicle 102 $G_{vehi}$, the driver's eye gaze direction toward a pedestrian that may be located within the surrounding environment of the vehicle 102 $G_{ped}$, the driver's eye gaze direction towards a sidewalk that may be located within the surrounding environment of the vehicle 102 $G_{side}$, and the driver's eye gaze direction towards other objects/surroundings that may be located within the interior of the vehicle 102 and/or the surrounding environment of the vehicle 102 (e.g., the steering wheel of the vehicle 102, the dashboard of the vehicle 102, the gear shift of the vehicle 102, the sky, buildings located within the surrounding environment of the vehicle 102).

The method 300 may proceed to block 306, wherein the method 300 may include receiving image data associated with the surrounding environment of the vehicle 102. In one embodiment, the data processing module 202 may be configured to communicate with the camera system 118 of the vehicle 102 to receive image data associated with the surrounding environment of the vehicle 102. As discussed above, the image data associated with the surrounding environment of the vehicle 102 may be captured by one or more external cameras of the camera system 118 of the vehicle 102.

In an exemplary embodiment, upon receiving the image data, the data processing module 202 may be configured to analyze the image data that pertains to the surrounding environment of the vehicle 102 using image logic (e.g., computer-executed instructions stored upon the storage unit 114 and/or the memory 130) to determine a scene of the surrounding environment of the vehicle 102. The scene of the surrounding environment may include one or more dynamic objects that may be located within the surrounding environment of the vehicle 102, one or more static objects that may be located within the surrounding environment of the vehicle 102, one or more roads/pathways that may be located within the surrounding environment of the vehicle 102, one or more lanes that may be located upon one or more roads/pathways that may be located within the surrounding environment of the vehicle 102, and the like.

The method 300 may proceed to block 308, wherein the method 300 may include receiving LiDAR data associated with the surrounding environment of the vehicle 102. As discussed above, the laser projection system 120 may be configured to receive one or more reflected laser waves based on one or more laser beams emitted by the LiDAR transceivers of the laser projection system 120. The one or more reflected laser waves may be reflected off of one or more objects (e.g., static and/or dynamic objects) that may be located within the surrounding environment of the vehicle 102.

In one configuration, the laser projection system 120 may be configured to output LiDAR data associated to one or more reflected laser waves to the data processing module 202. The data processing module 202 may be configured to analyze the LiDAR data that pertains to the surrounding environment of the vehicle 102 to determine the scene of the surrounding environment of the vehicle 102 based on the location of one or more dynamic objects that may be located within the surrounding environment of the vehicle 102, one or more static objects that may be located within the surrounding environment of the vehicle 102, one or more roads/pathways (e.g., that may include guardrails) that may be located within the surrounding environment of the vehicle 102, one or more lanes that may be located upon one or more roads/pathways that may be located within the surrounding environment of the vehicle 102, and the like.

The method 300 may proceed to block 310, wherein the method 300 may include determining a driving scene of the vehicle 102 based on the image data and/or the LiDAR data. In one embodiment, the data processing module 202 may be configured to aggregate data associated with the scene of the surrounding environment of the vehicle 102 as determined based on the image data with the scene of the surrounding environment of the vehicle 102 as determined based on the LiDAR data to determine a driving scene of the surrounding environment of the vehicle 102. The driving scene of the surrounding environment of the vehicle 102 may include one or more classifications of one or more objects, roadways, pathways, intersections, that may be based on one or more images and or more reflected laser waves based on operation of the camera system 118 and the laser projection system 120.

The method 300 may proceed to block 312, wherein the method 300 may include determining a driving scene complexity. In an exemplary embodiment, the data processing module 202 may be configured to analyze the driving scene of the vehicle 102 to determine attributes associated with the driving scene. As discussed the driving scene of the vehicle 102 may include one or more classifications of one or more objects, roadways, pathways, intersections, that may be based on one or more images and or more reflected laser waves based on operation of the camera system 118 and the laser projection system 120. The data processing module 202 may be configured to determine complexity values that may be associated with one or more of the classifications.

In one configuration, the data processing module 202 may determine complexity values that may be associated with various levels of classifications that may be associated with various roadways, traffic conditions, object complexities, and/or intersection conditions. For example, the various levels of classifications may be associated with levels of traffic density (low traffic LT, or high traffic HT). The various levels of classifications may also be associated with levels of object complexity (presence of other cars only CO, or presence of other cars and pedestrians CP). The data processing module 202 may analyze the complexity values associated with one or more levels of classifications that may be associated with various roadways, pathways, and/or intersection conditions and may output a scene complexity (value) $\alpha_c$.

Figure 4:
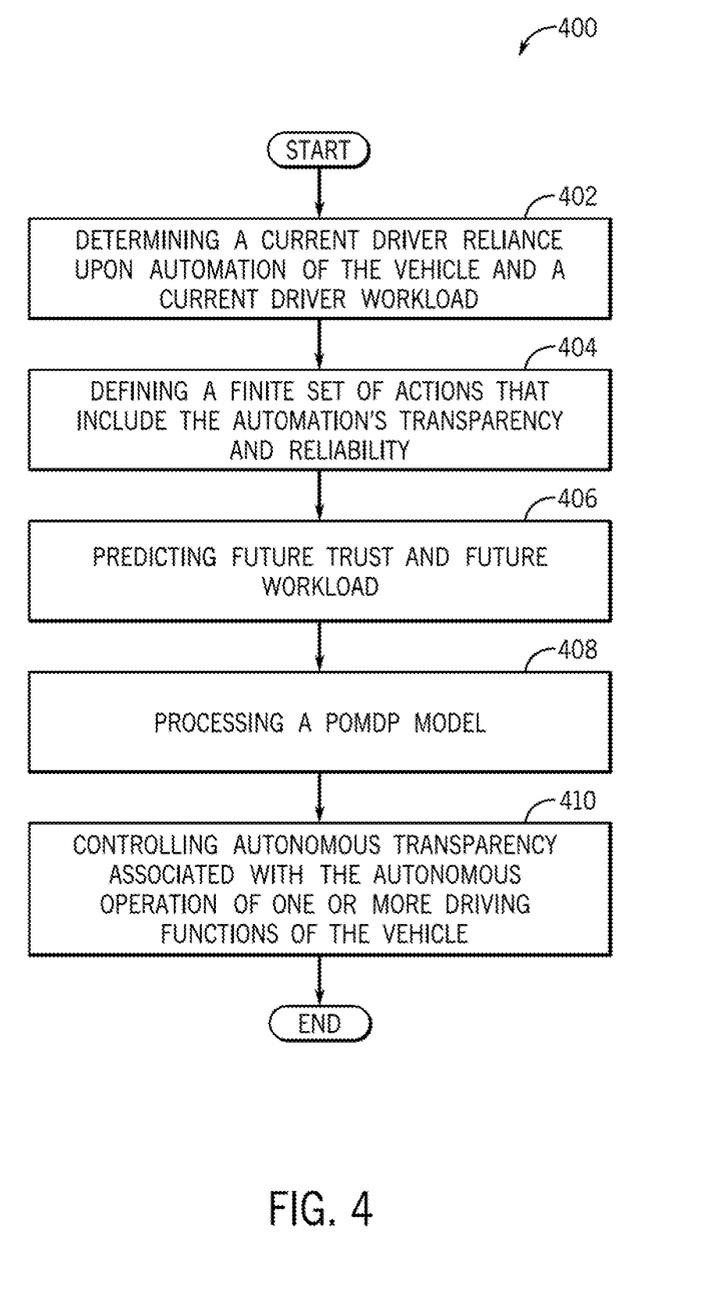
FIG. 4 is a process flow diagram of a method for processing a partially observable Markov decision process (POMDP) model and modeling trust dynamics and workload dynamics of the driver of the vehicle according to an exemplary embodiment of the present disclosure.

FIG. 4 is a process flow diagram of a method 400 for processing a POMDP model and modeling trust dynamics and workload dynamics of the driver of the vehicle 102 according to an exemplary embodiment of the present disclosure. FIG. 4 will be described with reference to the components of FIG. 1, through it is to be appreciated that the method 400 of FIG. 4 may be used with other systems/components. The method 400 may begin at block 402, wherein the method 400 may include determining a current driver reliance upon automation of the vehicle 102 and a current driver workload. In one embodiment, the driver state determinant module 204 may analyze one or more types of semi-autonomous and/or manual driving operations completed by the vehicle 102 and/or the driver to determine a driver's reliance (value) $O_R$. The reliance $O_R$ may include the driver relying on the automation $O_R=R^+$ or the driver not relaying on the automation $O_R=R^-$ as determined based on the one or more types of semi-autonomous and/or manual driving operations completed by the vehicle 102. For example, the driver's reliance $O_R$ may be defined based on the driver's fully relying on the automation to operate the vehicle 102 to its destination $O_R=R^+$, or not relaying on the autonomous operation of the vehicle 102 and manually taking over control of the vehicle 102 $O_R=R^-$ during a predetermined period of time. As discussed below, the driver's reliance value $O_R$ may be utilized to determine a trust state associated with a trust in the semi-autonomous operation of the vehicle 102.

Additionally, the driver state determinant module 204 may determine the driver's workload based on the driver's gaze direction(s) that are captured during a predetermined period of time (e.g., that are collected at n frames per second for the predetermined period of time). The driver's workload may be defined as a level of cognitive load that is required by the driver to process information associated with the semi-autonomous operation of the vehicle 102. As discussed, a level of automation transparency may be based on one or more real time augmented reality cues that are presented to the driver, the automation reliability, and the scene complexity may also be analyzed to determine the driver's workload dynamics.

In one embodiment, the driver state determinant module 204 may determine the workload dynamics of the driver based on the driver's discretized gaze direction $O_G$ such as the driver's eye gaze direction toward the road on which the vehicle 102 is traveling $G_{road}$, the driver's eye gaze direction toward another vehicle that may be located within the surrounding environment of the vehicle 102 $G_{vehi}$, the driver's eye gaze direction toward a pedestrian that may be located within the surrounding environment of the vehicle 102 $G_{ped}$, the driver's eye gaze direction towards a sidewalk that may be located within the surrounding environment of the vehicle 102 $G_{side}$, and the driver's eye gaze direction towards other objects/surroundings that may be located within the interior of the vehicle 102 and/or the surrounding environment of the vehicle 102 may be analyzed in addition to the semi-autonomous driving maneuvers and manual driving maneuvers of the vehicle 102 to output the driver's reliance or lack of reliance on the autonomous operation of the vehicle 102.

In one embodiment, the driver state determinant module 204 may thereby be configured to define a finite set of states of trust and workload $\mathcal{S}$ of the driver for several time stamps during the semi-autonomous operation of the vehicle 102 based on the determined driver's reliance over a predetermined period of time and the driver's eye gaze directions over the predetermined period of time. The driver state determinant module 204 may define the finite set of states $\mathcal{S}$ of the trust dynamics and workload dynamics POMDP as consisting of tuples of Trust state based on the driver's reliance and a Workload state that pertains to the workload of the driver with respect to the driver's eye gaze directions that occur at particular circumstances during the semi-autonomous operation of the vehicle 102.

In particular, the driver state determinant module 204 may define the finite set of states $\mathcal{S}$ of a trust workload as consisting of tuples of the Trust state $S_T$ and the Workload state $S_W$, i.e., $s \in \mathcal{S}$ and $s=[S_T, S_W]$. In one configuration, the trust state $S_T$ may either be defined as Low Trust $T_\downarrow$ or High Trust $T_\uparrow$ based on the determined finite set of states of trust of the driver during the semi-autonomous operation of the vehicle 102 based on the determined driver's reliance. Additionally, the driver state determinant module 204 may define the workload state $S_W$ as either a low workload $W_\downarrow$ or high workload $W_\uparrow$ based on the driver's determined finite set of states of workload of the driver during the semi-autonomous operation of the vehicle 102. In one example, for the low workload state, the driver's eye gaze direction may indicate a focus more on the roadway on which the vehicle 102 is traveling and additional vehicles that may be located within the surrounding environment of the vehicle 102. However, for the high workload state, the drive's eye gaze direction may indicate a focus that is distributed between pedestrians and sidewalk along with additional elements of the scene that includes the surrounding environment of the vehicle 102.

The method 400 may proceed to block 404, wherein the method 400 may include defining a finite set of actions that include the automation's transparency and reliability. In an exemplary embodiment, the driver state determinant module 204 may be configured to communicate data pertaining to the trust state and workload state to the decision process module 206 of the adaptive trust application 106. As the hidden states of trust $S_T$ and workload $S_W$ may be influenced by the characteristics of automation transparency and the scene complexity of the surrounding environment of the vehicle 102, the decision process module 206 may define a finite set of actions $\mathcal{A}$ as consisting of tuples $a \in \mathcal{A}$ that may include the (real-time) automation's transparency $a_T$ based on one or more augmented reality cues that may be presented to the driver through one or more of the display devices 112. The finite set of actions $\mathcal{A}$ consisting of tuples $a \in \mathcal{A}$ may include the (real-time) automation's transparency $a_T$ which may also be based also on reliability $a_r$ along with scene complexity $a_c$. In one configuration, the explicit definition of the possible values for each of the actions may depend on a specific interaction context. The observable characteristics of the driver may be defined as the finite set of observations $\mathcal{O}$ that may consist of driver reliance $o_r$ and gaze direction $O_G$.

The method 400 may proceed to block 406 and may include predicting future trust and future workload. In an exemplary embodiment, upon determining current trust and workload dynamics, the decision process module 206 may be configured to predict the driver's future trust and future workload that may occur during one or more semi-autonomous driving scenarios at one or more future times. The decision process module 206 may predict the driver's future trust and future workload based on the trust $S_T$ and workload $S_W$ at the current time. In particular, the decision process module 206 may utilize the trust $S_T$ and workload $S_W$ at the current time to affect the future trust $s'_T$ as well as the future workload $s'_W$ at the time t+1.

In one embodiment, the decision process module 206 may populate data points that correspond to the trust $S_T$ and workload $S_W$ at the current time and the predicted future trust $s'_T$ as well as the predicted future workload $s'_W$ at the time t+1 to the machine learning dataset 132. Accordingly, the decision process module 206 utilizes the POMDP model to capture the dynamic interaction between trust and workload behavior as it evolves over time by determining an effect on future driver trust and workload with respect to the automated driving of the vehicle 102 that is based on the scene complexity, the automation reliability, and the automation transparency to populate the machine learning dataset 132. In one or more embodiments, the decision process module 206 may process separate transition probability functions for the trust behavior of the driver as $T_T(s_T'|s_T, s_W, \alpha)$, and workload behavior as $T_W(s_T'|s_T, s_W, \alpha)$, as well as independent emission probability functions for reliance as $\varepsilon_T(O_R|s_T)$, and gaze direction as $\varepsilon_W(O_G|s_W)$.

The method 400 may proceed to block 408, wherein the method 400 may include processing a POMDP model. In one embodiment, the decision process module 206 may be configured to utilize the neural network 108 to execute a machine learning/deep learning probabilistic framework using the POMDP model of human trust and workload dynamics as they evolve during an individual's interaction with driving automation (e.g., SAE level 2 driving automation). The POMDP model may be trained using data associated with the driver that may capture the effects of scene complexity, automation reliability, and automation transparency on the driver's trust and workload with respect to semi-autonomous operation of the vehicle 102.

In particular, the POMDP may be computed to account for partial observability though hidden states. In one configuration, the POMDP may be configured as a 7-tuple ($\mathcal{S}$, $\mathcal{A}$, $\mathcal{O}$, $\mathcal{T}$, $\varepsilon$, $\mathcal{R}$, $\gamma$) based on data points that are retrieved from the machine learning dataset 132 from the where S is a finite set of states, $\mathcal{A}$ is a finite set of actions of the driver, and $\mathcal{O}$ is a set of observations. A transition probability function $\mathcal{T}$ (s'|s,a) may govern the transition from the current state s to the next state s' given the action a. An emission probability function $\varepsilon$(o|s) may govern the likelihood of observing o given the process is in state s. The POMDP may also include a reward function $\mathcal{R}$ (s',s,a) and a discount factor $\gamma$ that are used for processing an optimal control policy for controlling autonomous transparency and autonomous operation of one or more driving functions of the vehicle 102.

In one embodiment, the POMDP may be configured to provide a trust-workload model that may be utilized to estimate trust and workload levels of the driver continuously in real time using a belief state b(s). In particular, the decision process module 206 may analyze the trust-workload model to estimate trust and workload levels of the driver continuously using the belief state b(s) which may be iteratively calculated as:

$$b'(s') = p(s'|o, a, b) = \frac{p(o|s', a)\sum_{s\in S} p(s'|s, a)b(s)}{\sum_{s'\in S} p(o|s', a)b(s)}$$

In order to calibrate the driver's trust, the reward function may be defined to penalize trust miscalibration and reward trust calibration. For example, the decision process module 206 may allocate a penalty of −1.0 for trust workload POMDP when it is in a state of high trust with the automation reliability being determined as low and when it is in a state of low trust with the automation reliability being determined and/or predicted as being high. The module 206 may allocate a reward of 1.0 when it is in a state of high trust with the automation reliability being determined and/or predicted as being high and when it is in a state of low trust with the automation reliability determined and/or predicted as being low. The discount factor $\gamma$ may be additionally selected by the decision process module 206. Upon the determination of the reward function based on the real-time and predicted states, and the selection of the discount factor, the decision process module 206 may process the control policy based on the analysis of the dynamics of human trust and workload states modeled using the POMDP to determine the optimal level of automation transparency.

The method 400 may proceed to block 410, wherein the method 400 may include controlling autonomous transparency associated with the autonomous operation of one or more driving functions of the vehicle 102. In one embodiment, upon determining the optimal level of automation transparency, the decision process module 206 may store respective data points pertaining to the optimal level of automation transparency associated with one or more driving functions of the vehicle 102 within the machine learning dataset 132. In one embodiment, the transparency control module 208 of the adaptive trust application 106 may be configured to access the machine learning dataset 132 to retrieve the data points associated with the optimal level of automation transparency associated with one or more driving functions of the vehicle. The transparency control module 208 may thereby control the display device(s) 112 to provide respective levels of automation transparency of one or more driving functions of the vehicle 102 based on the data points. Accordingly, the transparency control module 208 may be configured to implement the optimal control policy determined based on the POMDP model based on states at a real-time and one more future points in time to appropriately vary automation transparency and autonomous operation of one or more driving functions to achieve trust calibration based on the POMDP model computed based on real-time data.

In particular, the transparency control module 208 may define the automation transparency ay in two levels as the absence of AR annotation cues and the presence of AR annotation cues that may be presented to the driver i.e., $a_T \in \{AR_{off}, AR_{on}\}$ through the display device(s) 112. Accordingly, the transparency control module 208 may selectively control the presence of one or more AR annotation cues that may be presented to the driver through one or more of the display devices 112 to adjust a level of transparency that may be provided to the driver with respect to the semi-autonomous control of one or more driving functions of the vehicle 102 based on the current trust and workload and the predicted trust and workload of the driver of the vehicle 102.

Figure 5:
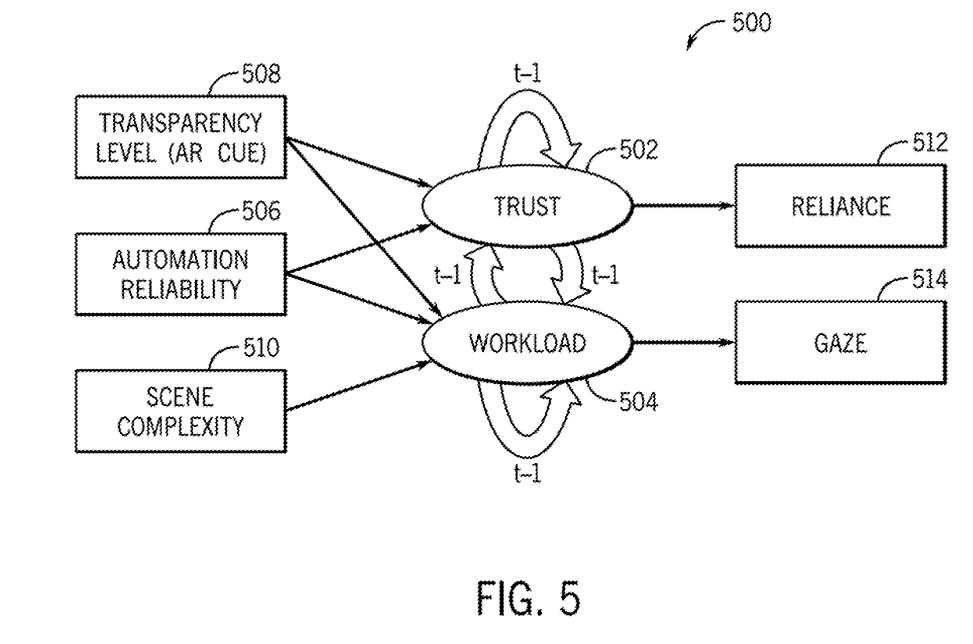
FIG. 5 is an exemplary schematic general overview of the POMDP model processed by the adaptive trust application according to an exemplary embodiment of the present disclosure.

As shown in FIG. 5, an exemplary schematic general overview of the POMDP model 500 processed by the adaptive trust application 106 according to an exemplary embodiment of the present disclosure, the structure of the POMDP model 500 may be based on trust 502 and workload 504. In one embodiment, the model 500 may be based on automation reliability 506 and automation transparency 508 in the form of one or more augmented reality cues as actions for trust dynamics that are based on reliance 512. Additionally, the model 500 may be based on automation reliability 506, automation transparency 508, and scene complexity 510 as actions for workload dynamics that are based on gaze direction 514.

Figure 6:
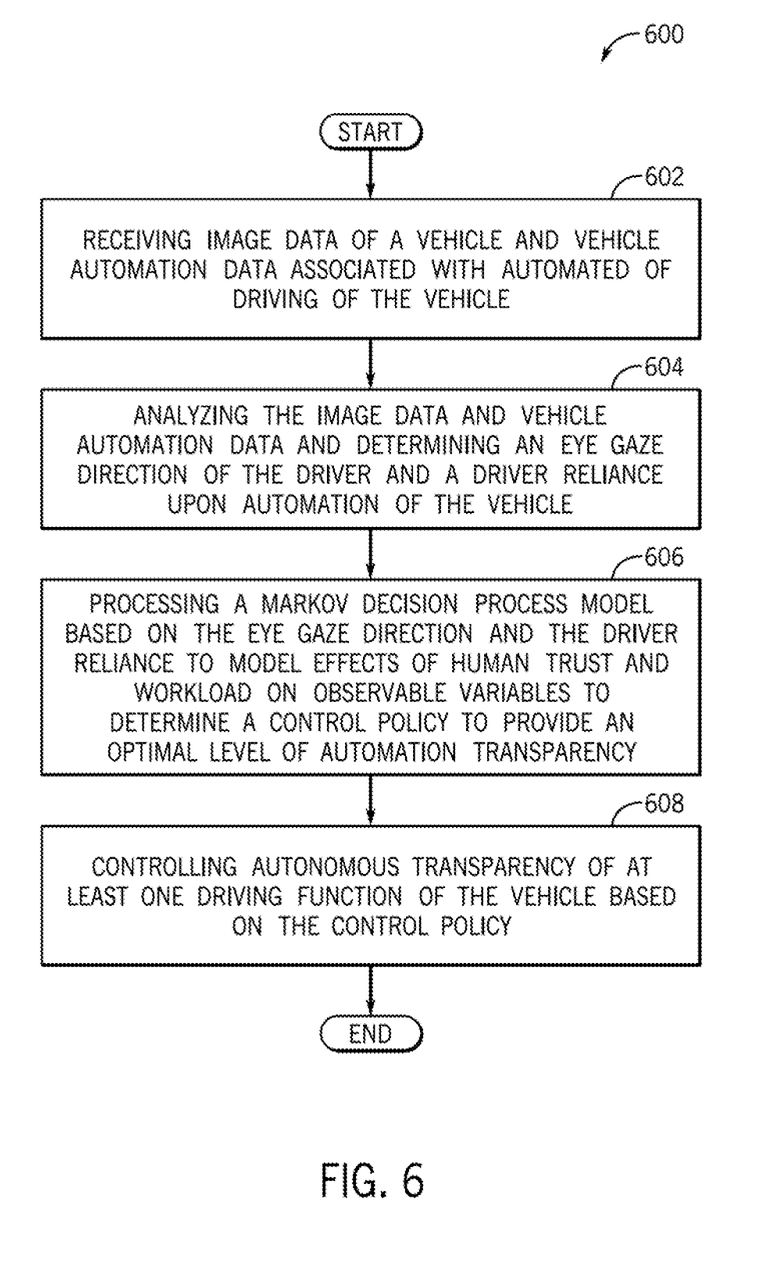
FIG. 6 is a process flow diagram of a method for providing adaptive trust calibration in driving automation according to an exemplary embodiment of the present disclosure.

FIG. 6 is a process flow diagram of a method 600 for providing adaptive trust calibration in driving automation according to an exemplary embodiment of the present disclosure. FIG. 6 will be described with reference to the components of FIG. 1, through it is to be appreciated that the method 600 of FIG. 6 may be used with other systems/components. The method 600 may begin at block 602, wherein the method 600 may include receiving image data of a vehicle 102 and vehicle automation data associated with automated of driving of the vehicle 102.

The method 600 may proceed to block 604, wherein the method 600 may include analyzing the image data and vehicle automation data and determining an eye gaze direction of a driver of the vehicle 102 and a driver reliance upon automation of the vehicle 102. The method 600 may proceed to block 606, wherein the method 600 may include processing a Markov decision process model based on the eye gaze direction and the driver reliance to model effects of human trust and workload on observable variables to process a control policy to provide an optimal level of automation transparency. The method 600 may proceed to block 608, wherein the method 600 includes controlling autonomous transparency of at least one driving function of the vehicle 102 based on the control policy.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optimal storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing adaptive trust calibration in driving automation comprising:

electronically receiving image data of a vehicle and vehicle automation data associated with automated of driving of the vehicle;

electronically analyzing the image data and vehicle automation data and determining an eye gaze direction of a driver of the vehicle and a driver reliance as a value that indicates a driver's reliance upon an autonomous operation of at least one driving function of the vehicle or that indicates non reliance by the driver upon the autonomous operation of at least one driving function and manual takeover of the vehicle;

electronically processing a Markov decision process model based on the eye gaze direction and the driver reliance to model effects of workload, wherein the workload is a level of cognitive load that is required by the driver to process information associated with the autonomous operation of the at least one driving function of the vehicle to determine a control policy to provide a particular level of automation transparency; and electronically controlling the autonomous transparency of at least one driving function of the vehicle based on the control policy, wherein a human machine interface is provided with at least one augmented reality annotation cue that is presented to the driver through at least one display device of the vehicle to adjust the autonomous transparency with respect to the autonomous operation of the at least one driving function.

2. The computer-implemented method of claim 1, wherein electronically receiving image data of the vehicle includes receiving image data associated with an interior cabin of the vehicle that includes captured images of eyes of the driver, wherein image data is also associated with an external surrounding environment of the vehicle.

3. The computer-implemented method of claim 2, wherein data associated with the captured images of the eyes of the driver are electronically analyzed using a linear model that takes into account an evaluation of specific areas of the eyes of the driver of the vehicle as the vehicle is being operated.

4. The computer-implemented method of claim 2, further including electronically receiving LiDAR data associated with the external surrounding environment of the vehicle, wherein the LiDAR data is aggregated with the image data that is associated with the external surrounding environment of the vehicle to determine a driving scene of the vehicle, wherein a driving scene complexity is determined and associated with the driving scene of the vehicle based on complexity values that are associated with at least one of: roadways, traffic conditions, object complexities, and intersection conditions.

5. The computer-implemented method of claim 4, wherein the value associated with the driver reliance is based on whether the driver completely relies on automation or does not completely rely on automation, wherein the value associated with the driver reliance is determined based on types of semi-autonomous and manual operations completed by the vehicle or the driver.

6. The computer-implemented method of claim 5, wherein the eye gaze direction of the driver, the automation transparency, and the driving scene complexity are utilized to model the effects of the workload.

7. The computer-implemented method of claim 6, further including electronically predicting a future workload based on the workload at a current point in time.

8. The computer-implemented method of claim 7, wherein electronically processing the Markov decision process model includes electronically executing a machine learning probabilistic framework using the Markov decision process model as a partially observable model through hidden states, wherein the dynamics of human workload at the current point in time and the future workload are modeled using the Markov decision process model.

9. The computer-implemented method of claim 8, wherein electronically processing the Markov decision process model includes electronically processing the Markov decision process model as a multiple tuple model that includes a finite set of states of the driver, the finite set of actions, and a set of observations, wherein the Markov decision process model includes a reward function and a discount factor that are used to process the control policy based on the effects of workload on observable variables.

10. A system for providing adaptive trust calibration in driving automation comprising:
a memory storing instructions when executed by a processor cause the processor to:
electronically receive image data of a vehicle and vehicle automation data associated with automated of driving of the vehicle;
electronically analyze the image data and vehicle automation data and determining an eye gaze direction of a driver of the vehicle and a driver reliance as a value that indicates a driver's reliance upon an autonomous operation of at least one driving function of the vehicle or that indicates non reliance by the driver upon the autonomous operation of at least one driving function and manual takeover of the vehicle;
electronically process a Markov decision process model based on the eye gaze direction and the driver reliance to model effects of workload, wherein the workload is a level of cognitive load that is required by the driver to process information associated with the autonomous operation of the at least one driving function of the vehicle to determine a control policy to provide an optimal level of automation transparency; and
electronically control the autonomous transparency of at least one driving function of the vehicle based on the control policy, wherein a human machine interface is provided with at least one augmented reality annotation cue that is presented to the driver through at least one display device of the vehicle to adjust the autonomous transparency with respect to the autonomous operation of the at least one driving function.

11. The system of claim 10, wherein electronically receiving image data of the vehicle includes receiving image data associated with an interior cabin of the vehicle that includes captured images of eyes of the driver, wherein image data is also associated with an external surrounding environment of the vehicle.

12. The system of claim 11, wherein data associated with the captured images of the eyes of the driver are electronically analyzed using a linear model that takes into account an evaluation of specific areas of the eyes of the driver of the vehicle as the vehicle is being operated.

13. The system of claim 11, further including electronically receiving LiDAR data associated with the external surrounding environment of the vehicle, wherein the LiDAR data is aggregated with the image data that is associated with the external surrounding environment of the vehicle to determine a driving scene of the vehicle, wherein a driving scene complexity is determined and associated with the driving scene of the vehicle based on complexity values that are associated with at least one of: roadways, traffic conditions, object complexities, and intersection conditions.

14. The system of claim 13, wherein the value associated with the driver reliance is based on whether the driver completely relies on automation or does not completely rely on automation, wherein the value associated with the driver reliance is determined based on types of semi-autonomous and manual operations completed by the vehicle or the driver.

15. The system of claim 14, wherein the eye gaze direction of the driver, the automation transparency, and the driving scene complexity are utilized to model the effects of the workload.

16. The system of claim 15, further including electronically predicting a future workload based on the workload at a current point in time.

17. The system of claim 16, wherein electronically processing the Markov decision process model includes electronically executing a machine learning probabilistic framework using the Markov decision process model as a partially observable model through hidden states, wherein the dynamics of human workload at the current point in time and the future workload are modeled using the Markov decision process model.

18. The system of claim 17, wherein electronically processing the Markov decision process model includes electronically processing the Markov decision process model as a multiple tuple model that includes a finite set of states of the driver, the finite set of actions, and a set of observations, wherein the Markov decision process model includes a reward function and a discount factor that are used to process the control policy based on the effects of workload on observable variables.

19. A non-transitory computer readable storage medium storing instructions that when executed by a computer, which includes a processor perform a method, the method comprising:
receiving image data of a vehicle and vehicle automation data associated with automated of driving of the vehicle;
analyzing the image data and vehicle automation data and determining an eye gaze direction of a driver of the vehicle and a driver reliance as a value that indicates a driver's reliance upon an autonomous operation of at least one driving function of the vehicle or that indicates non reliance by the driver upon the autonomous operation of at least one driving function and manual takeover of the vehicle;
processing a Markov decision process model based on the eye gaze direction and the driver reliance to model effects of workload, wherein the workload is a level of cognitive load that is required by the driver to process information associated with the autonomous operation of the at least one driving function of the vehicle to determine a control policy to provide a particular level of automation transparency; and
controlling the autonomous transparency of at least one driving function of the vehicle based on the control policy, wherein a human machine interface is provided with at least one augmented reality annotation cue that is presented to the driver through at least one display device of the vehicle to adjust the autonomous transparency with respect to the autonomous operation of the at least one driving function.

20. The non-transitory computer readable storage medium of claim 19, wherein electronically processing the Markov decision process model includes electronically processing the Markov decision process model as a multiple tuple model that includes a finite set of states of the driver, the finite set of actions, and a set of observations, wherein the Markov decision process model includes a reward function and a discount factor that are used to process the control policy based on the effects of workload on observable variables.

\* \* \* \* \*